United States Patent
Sawicki et al.

(10) Patent No.: US 10,927,859 B2
(45) Date of Patent: Feb. 23, 2021

(54) NOZZLE WITH LOCKING NUT

(71) Applicant: Hamilton Sundstrand Corporation, Charlotte, NC (US)

(72) Inventors: Piotr Sawicki, Bogdaniec (PL); Marcin Cis, Lutynia (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 273 days.

(21) Appl. No.: 15/647,581

(22) Filed: Jul. 12, 2017

(65) Prior Publication Data
US 2018/0073526 A1 Mar. 15, 2018

(30) Foreign Application Priority Data
Sep. 12, 2016 (EP) .................................. 16461555

(51) Int. Cl.
*F15B 13/043* (2006.01)
*F15B 9/07* (2006.01)
(Continued)

(52) U.S. Cl.
CPC ............ *F15B 13/0438* (2013.01); *F15B 9/07* (2013.01); *F15B 13/042* (2013.01); *F16K 31/36* (2013.01);
(Continued)

(58) Field of Classification Search
CPC .. F15B 13/0438; F16B 13/068; F16B 13/001; F16B 2/04
(Continued)

(56) References Cited

U.S. PATENT DOCUMENTS

| | | | |
|---|---|---|---|
| 683,082 A * | 9/1901 | Summerer | F16B 19/1063 411/28 |
| 3,065,145 A * | 11/1962 | Molander, Jr. | F15B 13/0438 137/625.62 |

(Continued)

FOREIGN PATENT DOCUMENTS

| | | |
|---|---|---|
| DE | 3630200 A1 | 3/1988 |
| DE | 4311216 A1 | 10/1994 |

(Continued)

OTHER PUBLICATIONS

Extended European Search Report for EP International Application No. 16461555.1, dated Feb. 27, 2017, 5 pages.

*Primary Examiner* — Jacob J Cigna
*Assistant Examiner* — Michael W Hotchkiss
(74) *Attorney, Agent, or Firm* — Cantor Colburn LLP

(57) ABSTRACT

A system is described for positioning and locking in place a nozzle within a cylindrical bore of a body, and a method for positioning and locking in place a nozzle within a cylindrical bore of a body is also described. The system has a nozzle having a tubular shape extending between a first end and a second end with an outer cylindrical surface and an inner surface, said inner surface comprising a thread. The system also has a locking member provided within said nozzle and comprising an outer circumferential surface having a thread that corresponds to the thread of the inner surface of the nozzle. The system also has means for providing torque to said locking member to screw said locking member into and within said nozzle via said threaded surfaces to thereby create a press-fit between said outer cylindrical surface and an inner surface of said cylindrical bore.

14 Claims, 5 Drawing Sheets

(51) Int. Cl.
    *F15B 13/042* (2006.01)
    *F16K 31/36* (2006.01)
    *F15B 19/00* (2006.01)
    *F15B 13/00* (2006.01)
(52) U.S. Cl.
    CPC ............ *F15B 13/00* (2013.01); *F15B 13/0436* (2013.01); *F15B 19/002* (2013.01)
(58) Field of Classification Search
    USPC ............................... 411/60.2, 57.1; 403/371
    See application file for complete search history.

(56) References Cited

U.S. PATENT DOCUMENTS

| | | | | |
|---|---|---|---|---|
| 3,202,034 A * | 8/1965 | Korenchan | ............ | F16B 13/068 411/24 |
| 3,415,283 A * | 12/1968 | Trbovich | ............ | F16K 31/0682 137/625.62 |
| 3,556,150 A | 1/1971 | King | | |
| 4,015,505 A * | 4/1977 | Murray | ............... | F16B 19/1063 411/80.6 |
| 5,070,898 A * | 12/1991 | Jagodzinski | ........ | F15B 13/0438 137/82 |
| 6,076,797 A * | 6/2000 | Schnautz | ................ | B29C 33/04 220/235 |
| 6,648,014 B1 * | 11/2003 | Takahashi | ........... | F15B 13/0438 137/545 |
| 6,874,527 B2 * | 4/2005 | Meeder | ................ | E03C 1/0401 137/359 |
| 2005/0089364 A1 * | 4/2005 | Geib | ...................... | F16B 9/023 403/370 |

FOREIGN PATENT DOCUMENTS

| | | |
|---|---|---|
| EP | 2679875 A1 | 1/2014 |
| GB | 845109 A | 8/1960 |
| GB | 1100149 A | 1/1968 |

* cited by examiner

நоZZLE WITH LOCKING NUT

FOREIGN PRIORITY

This application claims priority to European Patent Application No. 16461555.1 filed Sep. 12, 2016, the entire contents of which is incorporated herein by reference.

TECHNICAL FIELD

The examples described herein relate to a method for positioning and locking a nozzle in place within a valve body. The examples described herein also relate to a nozzle for positioning and locking in place within a servovalve body. The nozzles and method may be used, amongst other applications, in conjunction with a flapper/type servovalve.

BACKGROUND

A hydraulic servovalve is a servo with a device (either flapper nozzle or jet pipe) used to position the servo. When servovalves are controlled through an electrical signal they are called electrohydraulic servovalves. Servovalves are normally used when accurate position control is required and this position control may be achieved through a closed loop control system, consisting of command sensor, feedback sensor, digital or analogue controller, and the servovalve.

Flapper nozzle systems for use in servovalves are well known. Flapper position is controlled by the electromagnetic torque motor and the torque developed by the torque motor is proportional to the applied current, with currents generally being in the milliamp range. A torque motor consists of two permanent magnets with a coil winding attached to a magnetically permeable armature. The armature is part of the flapper piece. When a current is applied to the coils, magnetic flux acting on the ends of the armature is developed. The direction of the magnetic flux (force) depends on the direction of the current. The magnetic flux will cause the armature tips to be attracted to the ends of the permanent magnets (current direction determines which magnetic pole is attracting and which one is repelling). This magnetic force creates an applied torque on the flapper assembly, which is proportional to the applied current. In the absence of any other forces, the magnetic force would cause the armature to contact the permanent magnet and effectively lock in this position. However, other forces are acting on the nozzle, such that flapper position is determined through a torque balance consisting of magnetic flux (force), hydraulic flow forces through each nozzle, friction on the flapper hinge point, and any spring (wire) connecting the flapper to the spool (which is almost always installed used in servovalves to improve performance and stability).

As the applied current is increased, the armature and flapper will rotate. As the flapper moves closer to one nozzle, the flow area through this nozzle is decreased while the flow area through the other nozzle increases.

Servovalves can be used to control hydraulic actuators or hydraulic motors. When a servoactuator is used to control an actuator, the servovalve and actuator combination are often referred to as a servoactuator. The main advantage of a servovalve is that a low power electrical signal can be used to accurately position an actuator or motor. The disadvantage is their complexity and the resulting costs of components consisting of many detail parts manufactured to very tight tolerances. Therefore, servovalves are generally only used when accurate position (or rate) control is required.

SUMMARY

A system for positioning a nozzle within a body is described herein. The body has a cylindrical bore defining an inner surface. The system comprises the nozzle that is to be positioned, the nozzle having a tubular shape and extending between a first end and a second end, with an outer cylindrical surface and an inner surface. The inner surface comprises a thread. The system further comprises a rotatable locking member which is provided within the nozzle. The locking member further comprises an outer circumferential surface having a thread that corresponds to the thread of the inner surface of the nozzle. The system further comprises means for providing torque to the locking member, to screw said locking member into and within said nozzle via said threaded surfaces, to thereby create a press-fit between said outer cylindrical surface of the nozzle and an inner surface of said body having said cylindrical bore.

In any of the examples described herein, the first end of said nozzle may be configured to receive said locking member and the nozzle may comprise a first portion extending from said first end and in the direction of said second end. The first portion may comprise at least one cut-out section extending from said first end in the direction of the second end.

In any of the examples described herein, the cut-out section may comprise a longitudinal shape extending axially in the direction of said nozzle second end.

In any of the examples described herein, the nozzle may comprise a plurality of said cut-out sections provided around its circumference with material sections provided between said cut-out sections.

In any of the examples described herein, said nozzle may comprise a second portion extending from said first portion, wherein said second portion comprises a solid tubular shape.

In any of the examples described herein, said nozzle may have an inner diameter that decreases between said first end and said second end.

In any of the examples described herein, said locking member may be ring shaped with a first side and a second side and the outer circumference of said ring shaped locking nut may decrease between said first side and said second side to provide a tapered outer surface that tapers at a first angle between said first side and said second side.

In any of the examples described herein, said nozzle may have an inner diameter that decreases between said first end and said second end to provide a tapered inner surface that tapers at a second angle between said first end and said second end and said nozzle first end may be configured to receive said locking member second end.

In any of the examples described herein, said outer cylindrical surface of said locking member may be in contact with said inner surface of said nozzle, and said first angle and said second angle may be equal.

In any of the examples described herein, said inner surface of the nozzle and said outer surface of said locking member may be sized and/or shaped relative to each other so that said locking member fits within said nozzle with said tapered surfaces contacting each other.

In any of the examples described herein, said locking member may be configured to be screwed so as to move axially in the direction of said nozzle second end.

In any of the examples described herein, the system may further comprise means for preventing rotation of said nozzle within said body when said torque is applied to said locking member.

In any of the examples described herein, said means for preventing rotation of said nozzle within said body may comprise a tube extending from a first end to a second end, said second end of the anti-rotation tube comprising means for interlocking the second end of the tube with the first end of the nozzle.

In any of the examples described herein, the means for interlocking may comprise at least one cut-out section at said second end of said anti-rotation tube and at least one cut-out section at said first end of said nozzle, said cut-out sections being shaped and sized so as to enable the two ends to slot together and interlock.

In any of the examples described herein, said nozzle may be sized so as to fit within said body having said cylindrical bore so that said outer surface of said nozzle contacts the inner surface of said body.

In any of the examples described herein, said body having a cylindrical bore may comprise a first material and said locking member may also comprise the same first material.

In any of the examples described herein, the body having a cylindrical bore and/or locking member may comprise a first material and said nozzle may comprise a second material and said first material may be different to said second material.

A method is also described herein for positioning and fixing in place a nozzle within a body having a cylindrical bore defining an inner surface, the method comprising: positioning said nozzle within said cylindrical bore of said body, said nozzle having a tubular shape extending between a first end and a second end with an outer cylindrical surface and an inner surface, said inner surface comprising a thread, and providing a locking member within said nozzle, said locking member comprising an outer circumferential surface having a thread that corresponds to the thread of the inner surface of the nozzle and said method further comprising providing torque to said locking member to screw said locking member into and within said nozzle via said threaded surfaces to thereby create a press-fit between said outer cylindrical surface of the nozzle and an inner surface of said cylindrical bore of said body.

In any of the examples described herein the method may further comprise the step of said first end of said nozzle receiving said locking member, and further wherein said nozzle comprises a first portion extending from said first end and in the direction of said second end, said first portion and further comprising providing at least one cut-out section extending from said first end in the direction of the second end.

In any of the examples described herein the method may further comprise providing a plurality of said cut-out sections around the nozzle circumference and with wall sections between said cut-out sections.

In any of the examples described herein, the method may further comprise the step of tapering the inner diameter of the nozzle so that it decreases between said first end and said second end.

In any of the examples described herein, the outer surface of the locking member may be ring shaped with a first side and a second side and the method may further comprise the step of tapering, at a first angle, the outer surface of the ring shaped locking member so that the outer diameter of the locking member decreases between said first side and said second side at said first angle.

In any of the examples described herein, the method may further comprise the step of tapering the inner surface of the nozzle so that the inner diameter of the nozzle decreases between said first end and said second end to provide a tapered inner surface that tapers at a second angle between said first end and said second end, said first angle and said second angle being equal.

In any of the examples described herein, the method may further comprise the step of sizing and/or shaping the inner surface of the nozzle and the outer surface of said locking member relative to each other so that said locking member fits within said nozzle with said tapered surfaces contacting each other.

In any of the examples described herein the method may further comprise the step of rotating said locking member along a screw thread so as to move said locking member axially in the direction of said nozzle second end.

In any of the examples described herein, the method may further comprise the step of providing a nozzle anti-rotation member having a first end and a second end and further comprising the step of, prior to the step of positioning the nozzle in place within the cylindrical bore of said body, connecting the second end of the nozzle anti-rotation member to the first end of the nozzle and inserting the nozzle into the cylindrical bore of said body by moving the anti-rotation member and nozzle axially within said cylindrical bore in the direction of the second end of the nozzle.

In any of the examples described herein, the method may further comprise the step of fixing in position the first end of the anti-rotation member to thereby prevent rotation of said nozzle within said body when said torque is applied to said locking member.

In any of the examples described herein, the anti-rotation member may comprise a tube extending from a first end to a second end, said second end of the anti-rotation tube comprising means for interlocking the second end of the tube with the first end of the nozzle.

In any of the examples described herein, the means for interlocking may comprise at least one cut-out section at said second end of said anti-rotation tube and at least one cut-out section at said first end of said nozzle, said cut-out sections being shaped and sized so as to enable the two ends to slot together and interlock.

DETAILED DESCRIPTION

Figure 1:
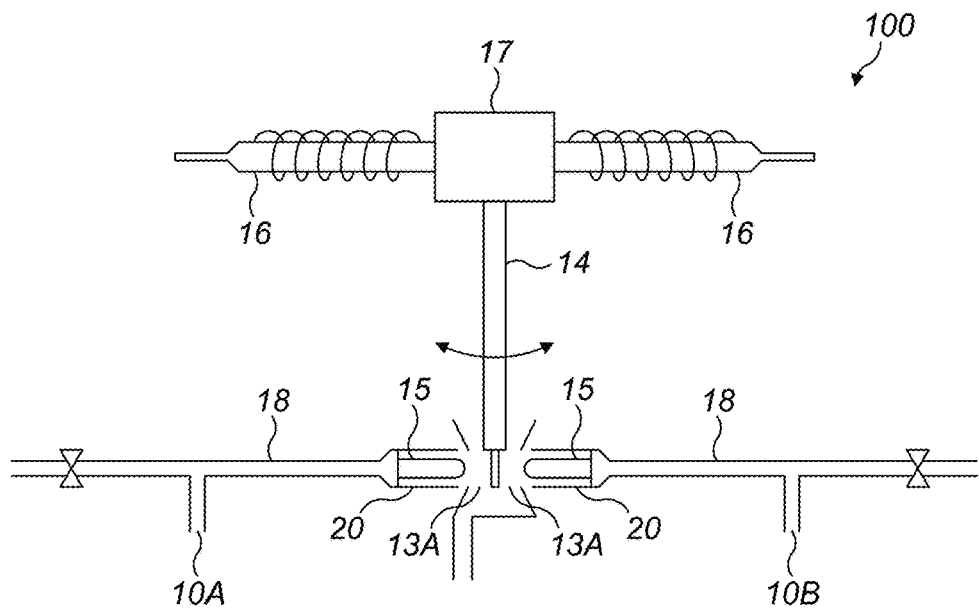
FIG. 1 is a schematic diagram showing a section of a known nozzle/flapper type servovalve.

An example of a known type of double flapper nozzle 100 that may be used with a servovalve is depicted, for example, in FIG. 1. FIG. 1 does not depict the entire servovalve, but only the main features of the nozzles and flapper. The servovalve device has a torque motor having an armature 17 with one or more coils 16, flapper 14 and nozzles 15. In use, fluid pressure is supplied to the points 10A and 10B. Orifices 13A and 13B are formed on each side between the flapper 14 and the opposing nozzles 15. As long as the flapper is centered, the orifices 13A and 13B are the same on both sides and the pressure drop to the return is the same. Pressure at 10A equals the pressure at 10B, and the spool connected to the servo (not shown) is in force balance. If the torque motor 17 rotates the flapper 14 clockwise then the orifice 13A on the left is smaller than the orifice 13B on the right, and the pressure at 10A will be greater than the pressure at 10B. This pressure difference shifts the spool of the servovalve to the right. As the spool shifts, it deflects a feedback spring connected to the servo (not shown). The spool continues to move until the spring force produces a torque that equals the electromagnetic torque produced by the current flowing through the coil 16 around the armature 17. At this point, the armature 17 is moved back to the center position, the flapper 14 is centered, the pressure becomes equal at 10A and 10B, and the spool stops. The spool of the servovalve stays in this position until the current through the coil 16 changes. Because of the feedback spring, the spool has a unique position corresponding to each current through the coil 17 ranging from 0 to rated current. At rated current, the spool is shifted to its full open position.

In order to control flow in a linear manner, the circumferential area created by the flapper distance to the nozzle must be smaller than the nozzle diameter, such that the circumferential area controls flow and not the nozzle diameter. In this way, the flow area varies linearly with flapper position. Also, the torque motor materials, windings and overall design features lead to accurate control of torque such that small movements of the flapper are possible. This leads to accurate control of the pilot spool, which in turns provides accurate control of the actuator.

The goal of the flapper and nozzles is to control the pressure acting on both sides of the pilot spool. When the flapper is in the neutral position, the nozzle flow areas are equal and the pressures on both side of the spool are equal.

Figure 2:
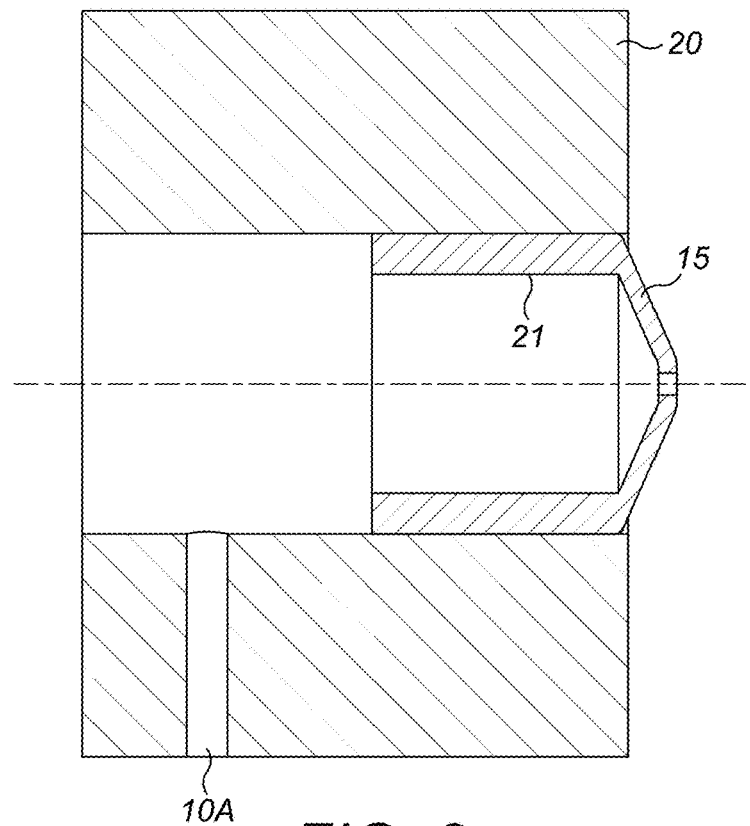
FIG. 2 depicts a cross section of a known nozzle within the body of a servovalve.

FIG. 2 depicts a cross section of a known type of nozzle such as that described with reference to FIG. 1. The calibration is carried out by a push rod (not shown) that is connected with the nozzle 15 by a nozzle internal thread 21. The servovalve is calibrated by movement of the nozzles 15 into the correct position within the body 20 of the servovalve. Once the nozzle 15 is in the correct position and calibration has been completed, it is no longer possible to then move the nozzle at a later date. The nozzle 15 is then only held in position within the housing or body 20 of the servovalve via a constant press fit.

Having a constant press-fit during and after calibration is a major disadvantage because the servovalve works at various temperatures and the press fit has to be sufficient at those temperatures. Due to the different coefficient of thermal expansions of both the nozzle 15 and housing 20 materials this therefore can create problems. With known nozzles, this problem is addressed by using very tight tolerances of the housing 20 and nozzle 15 dimensions, however very tight tolerances provide great challenges for the manufacturing of such parts and are also very expensive. Additionally, the process of calibration with known nozzles and systems is difficult because axial forces due to the constant press-fit are enormous, causing insufficient accuracy of positioning of the nozzle 15 inside the servovalve housing 20. In addition to this, due to the high forces in the body of the servo, the nozzle and/or servo can often become damaged during calibration.

The examples described herein with reference to FIGS. 3 to 8 overcome such disadvantages as they provide a new and improved means of positioning and locking the nozzle in place during and after calibration that not only provides a sufficient press fit to hold the nozzle in the correct place, but also greatly improves the ease with which the calibration can be obtained in the first place.

A nozzle with a locking member and a new method and means for positioning and locking in place a nozzle within the body of a servovalve will now be described with reference to FIGS. 3 to 8. The same reference numerals are used to represent the corresponding features in each of the FIGS. 3 to 8.

Figure 3:
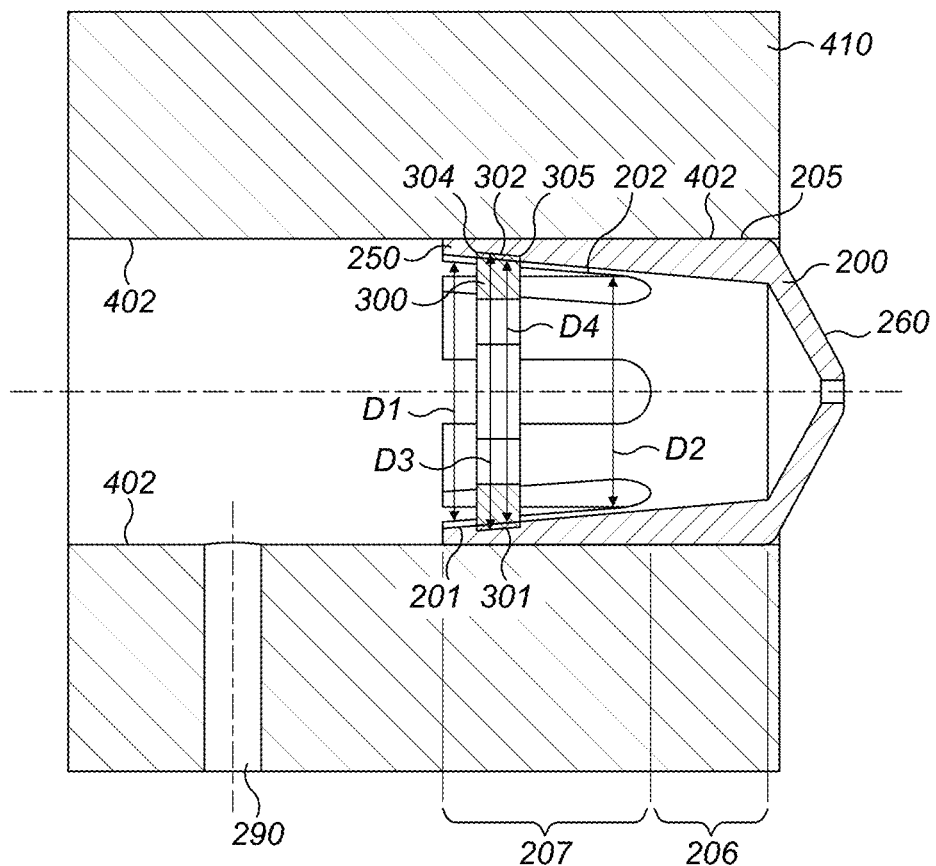
FIG. 3 depicts a cross section of an example of a new nozzle positioning system provided within the body of a servovalve.

FIG. 3 depicts a cross section of an example of a new type of nozzle 200 positioned within the body, or housing, 410 of a servovalve after calibration. As can be seen in this figure, the body, or housing, 410 of the servovalve in which the nozzle is positioned is a hollow tube. As is known in the art, during calibration, fluid flow (fuel or air) is provided through the supply port(s) 290 and directed towards and out of the end 260 of the nozzle 200.

The nozzle 200 is hollow and comprises an elongated cylindrical wall extending between a first end 250 and a second end 260. In the example shown in FIGS. 3 to 8, in use, the second end 260 of the nozzle is the end which would be closest to the flapper, as described above, with reference to FIG. 1. The first end 250 of the example shown in FIGS. 3 to 5 has a first opening which is wider than an opening at the second end 260.

In the examples shown in FIGS. 3 to 8, the means for locking the nozzle 200 in position comprises a rotatable locking member 300. In some examples, the locking member 300 may comprise a locking nut, as shown in FIGS. 3, 4, 5 and 6. The locking member 300 is provided within the nozzle 200 and has an outer circumferential surface that is ring shaped. The ring shaped locking member 300 has a first side 304 and an opposite second side 305 and a circumferential outer surface 302 extending there between. In some examples, the circumferential outer surface 302 may have a thread 301 extending circumferentially around the outer surface 302 that is sized and shaped and configured to match and mate with a thread 201 that is provided on the circumferential inner surface 202 of the nozzle 200, as described later.

Figure 4:
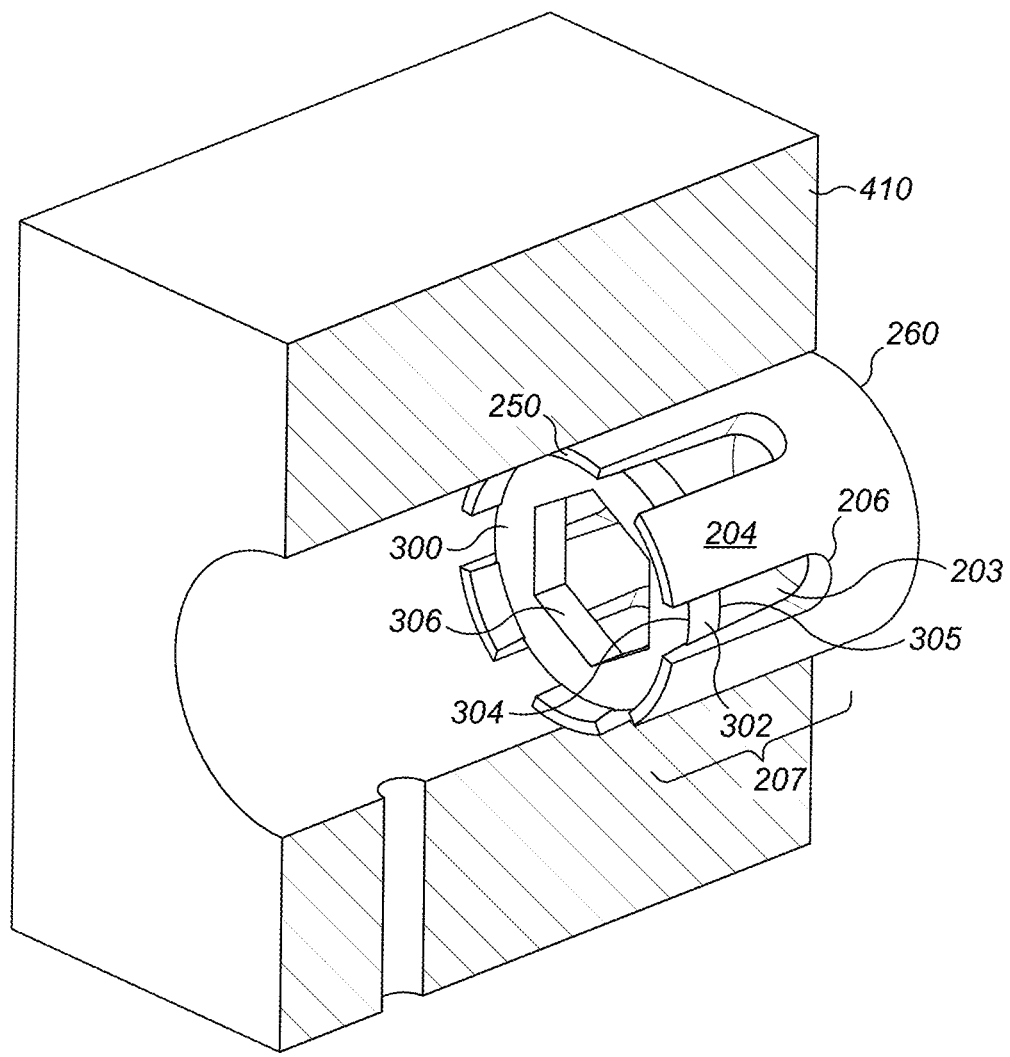
FIG. 4 is perspective view of FIG. 3.
Figure 5:
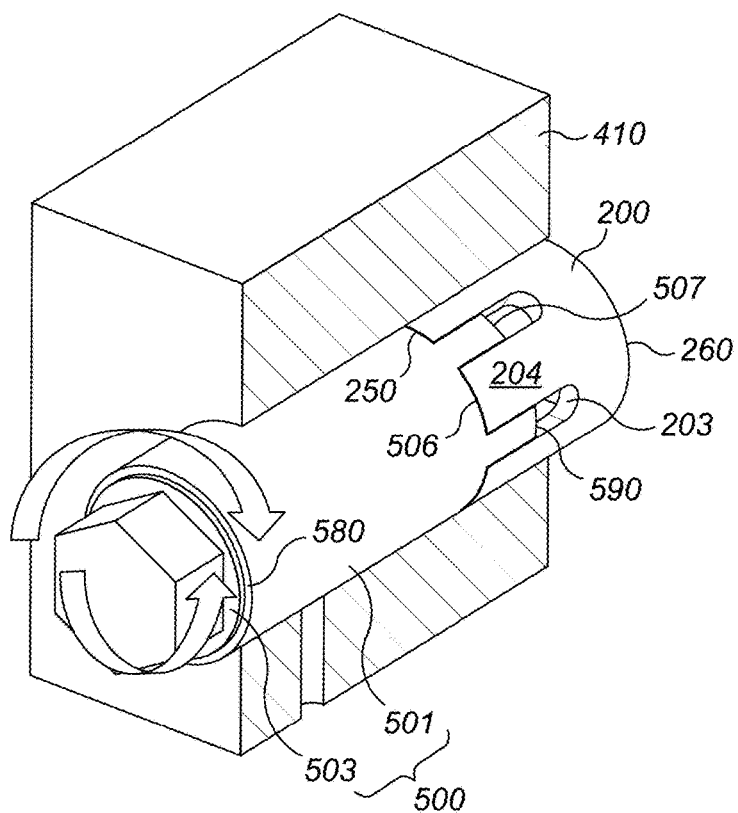
FIG. 5 is a perspective view of an example of a new nozzle positioning system being positioned within the body of a servovalve.

As can be seen in FIGS. 3 to 5, the locking member 300 may therefore have an outer surface 302 and an outer circumference that is shaped and sized so as to be in contact with the inner surface 202 and inner circumference of the nozzle 200 so that the surfaces contact each other in use.

The first end 250 of the nozzle is configured to receive the locking member 300 and the nozzle 200 can be described as having a first portion 207 extending from the first end 250 of the nozzle 200 and in the direction of the second end 260 of the nozzle. In some examples, the first portion 207 of the nozzle comprises at least one cut-out section 203 extending from the first end 250 of the nozzle 200 in the direction of the second end 260 of the nozzle 200.

In some of the examples described herein, the nozzle 200 may have a plurality of cut-out sections 203 at its first end 250 and in the first portion 207. Each cut-out section 203 corresponds to an area of the first portion 207 wherein a section of the nozzle body has been cut away and removed leaving a recess 203 in the nozzle.

In the example shown in FIG. 4, the nozzle 200 comprises six cut-out sections 203, however, any number of cut-out sections 203 may be provided. Nozzle body wall sections 204 are therefore provided between these cut-out sections so that the cut-out sections 203 form a plurality of recesses 203 in the nozzle body wall, extending from its first end 250 and in the direction of the second end 260.

In some of the examples described herein, the cut-out sections 203 comprise a longitudinal shape extending axially in the direction of the nozzle second end 260. The corresponding nozzle wall sections 204 are therefore also longitudinal in shape and extend axially in the direction of the nozzle second end 260.

In the examples shown herein the nozzle's first end 250 comprises six longitudinal wall sections 204 extending from the nozzle first end 250 in the direction of its second end 260, in between six longitudinal cut out sections 203, however, these recesses 203 and nozzle body wall sections 204 there between may be any shape or in any number. The presence of these cut-out sections 203 and respective wall sections 204 provided between each cut out section 203 results in an increase in the compliance of the nozzle 200 and so the locking member 300 can therefore be more easily inserted into the first end 250 of the nozzle and can also be screwed in within the nozzle 200 deeper than if the nozzle did not have any cut out sections 203. This therefore provides an improved press fit of the nozzle 200 within the servovalve body or housing 410 as the locking member 300 is able to be inserted deeper within the nozzle 200 and with greater ease. These cut-out sections 203 also provide a part of an interlocking means, as described below, which allow the nozzle to be interlocked and attached to a nozzle anti-rotation means 501, described later, to thereby prevent the nozzle 200 from rotating when torque is applied to the locking member 300.

As can be seen in FIGS. 3 to 6 and 8, the nozzle 200 further comprises a second portion 206 extending from this first portion 207 in the direction of the nozzle second end 260, wherein the second portion 206 comprises a solid tubular shape with a circumferentially extending wall. This second portion 206 of the nozzle 200 may result in a press-fit seal between the external surface 205 of the nozzle 200 and the inner surface 402 of the body 410 in which it is positioned, as described below.

The thread 201 provided on the inner surface 202 of the nozzle 200 and the corresponding thread 301 provided on the outer surface 302 of the locking member 300 may both further be tapered; however, this is not a necessity and in some examples, the thread 201, 301 may not be tapered. Providing a tapered thread on both the nozzle 200 and locking member 300 may also help to improve the ease with which the locking member 300 is inserted into and within the nozzle and further may improve the press-fit during the screwing in of the locking member 300.

The dimensions and shapes of the nozzle 200 and the locking member 300 may also themselves be tapered. An example of a system wherein the nozzle 200 has an inner surface 202 that is tapered and wherein the locking member 300 has an outer surface that is tapered is shown in FIG. 3. In some examples, the outer surface 302 of the locking member 300 may be tapered so that the external diameter of the locking member 300 decreases in the direction of the locking member's second side 305 (i.e. away from the first side 304) from a first diameter D3 to a second diameter D4, the taper being at a first angle.

The inner surface 202 of the nozzle may also be tapered so that the internal diameter of the nozzle 200 decreases in the direction of the second end 260 (i.e. away from the first end 250 and the cut-out sections 203 of the nozzle 200) from a first diameter D1 to a second diameter D2 at a second angle. These first and second taper angles may match and be equal so that as the locking member 300 is rotated, the second side 305 of the locking member is moved axially in the direction of the nozzle second end 260 via the correspondingly shaped surfaces and threads having matching tapering angles. This tapering of the corresponding surfaces in this direction also means that as the locking member is moved further within the nozzle in the direction of the second end of the nozzle, the screw becomes tighter and tighter within the nozzle.

These corresponding tapered surfaces also enable the locking member 300 to be more easily inserted into the nozzle via its first end 250 and also enable the locking member 300 to provide a greatly improved press fit of the nozzle against the inner surface 402 of the housing 410.

FIG. 4 depicts a perspective view of the nozzle 200 positioned in the housing 410, (with part of the housing 410 cut away to show the nozzle 200), with the locking member 300 in place.

FIG. 5 depicts a means 500 for positioning and locking the nozzle 200 in place within the body 410 of the servovalve. This means 500 for positioning and locking the nozzle 200 in place may comprise means 502 for screwing the locking member 300 into place within the nozzle 200. FIG. 5 shows how the locking nut 300 may be screwed inside the nozzle 200. The means 500 for positioning and locking the nozzle 200 in place may further comprise means 501 for preventing rotation of the nozzle 200 when the locking member 300 is screwed into and within the nozzle 200.

As can be seen in FIG. 5, the means for preventing rotation of the nozzle 200 as it is being fixed in place may comprise a nozzle anti-rotation means 501 (at least part of which may be external to the housing during calibration of the nozzle). This may be provided to prevent any possible rotation of the nozzle 200 as the locking member 300 is screwed into place within the nozzle 200.

In the examples described herein, the first end 580 of the anti-rotation member 501 may be fixed so as to thereby prevent rotation of the nozzle 200 within the body 410, whilst still enabling torque to be provided to the locking member 300.

Figure 7:
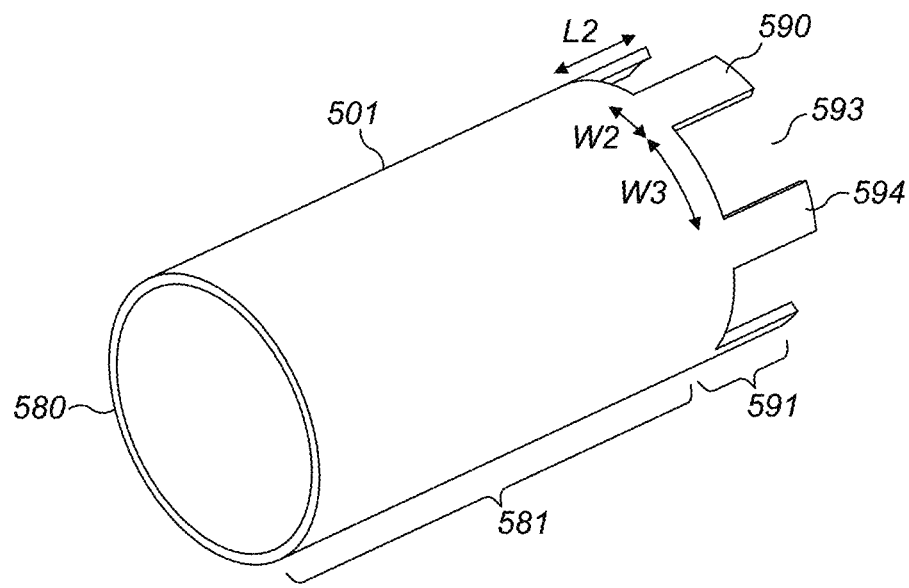
FIG. 7 depicts a nozzle anti-rotation tube used for positioning and locking the nozzle in place within the housing.

This is shown in FIG. 7. The nozzle anti-rotation means 501 may comprise a hollow tube having a first end 580 and a second end 590. The tube may comprise a first section 581 extending from the first end 580 in the direction of the second end 590 and a second section 591 extending from this first section 581 to the second end 590 of the tube 501.

The second section 591 of the tube 501 may comprise at least one cut-out section 593, or recess formed in the tube as shown in FIG. 7. In some examples, there may be a plurality of cut-out sections 593 or recesses 593 with sections of tube wall 594 extending axially between each recess 593 to provide protruding wall sections 594, in the same way as for the corresponding portion of the nozzle 200 as described above. The second section 591 of the tube 501 therefore comprises a shape and structure that is the same as or at least very similar to the first section 207 of the nozzle 203 that comprises cut-out sections 203.

Figure 8:
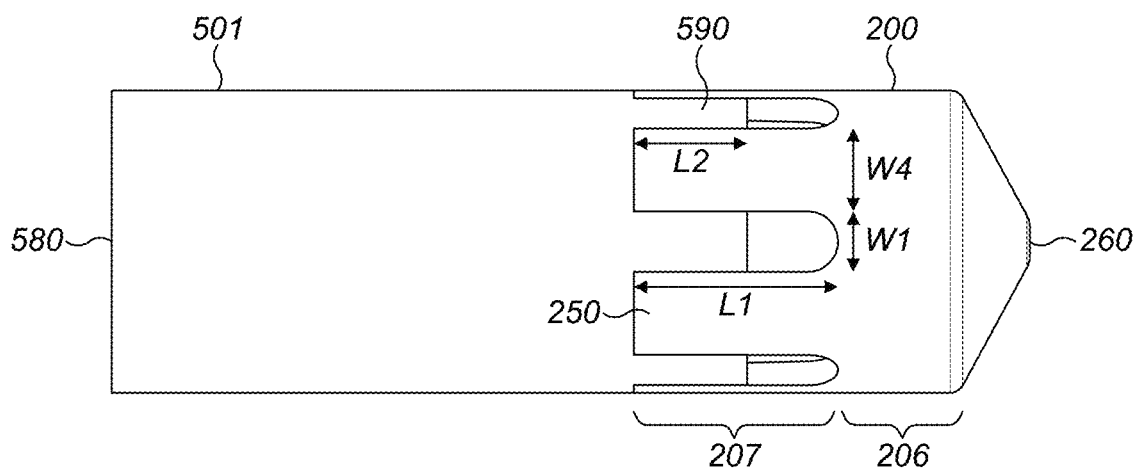
FIG. 8 depicts the nozzle anti-rotation tube of FIG. 7 in combination with a new type of nozzle such as that shown in FIGS. 3, 4, 5 and 6.

As can be seen in FIG. 8, the circumferential widths W1 of the cut-out sections 203 of the nozzle correspond to the circumferential widths W2 of the wall sections 594 of the tube 501 between the recesses 593 and the circumferential widths W3 of the cut-out sections 593 of the tube correspond to the circumferential widths W4 of the wall sections 204 of the nozzle between the recesses 203. Due to this, the longitudinal wall sections 204 of the nozzle 200 slot into place perfectly within the recesses 593 of the tube 501 and vice versa to interlock the nozzle 200 to the tube 501 as shown in FIG. 8.

The relative axial lengths L1 of the recesses 203 of the nozzle 200 are not so important in relation to the lengths L2 of the protruding wall sections 594 of the tube 501 (see FIG. 8 where the recesses are longer than the nozzle protruding sections), however, the relative widths W1, W3 of the recesses 203, 593 and widths W2, W4 of the protruding wall sections 204, 594 should be similar enough that they result in the end 590 of the anti-rotation means 501 interlocking with the first end 250 of the nozzle. In other words, they must contact each other to provide the interlocking of the nozzle 200 with the nozzle anti-rotation tube 501.

Although longitudinal recesses are shown here, other shaped recesses and interlocking means can also be used with the examples described herein.

In order to position the nozzle 200 in place within the body of the servovalve, the second end 590 tube 501 is connected to the first end 250 of the nozzle 200 via the interlocking means, which in the examples described herein comprises interlocking of the recesses 203, 593. Other interlocking/connecting means may also be used. The nozzle 200 is then inserted into the body 410 of the servovalve and when the nozzle is in the correct position within the servovalve body 410, the first end 580 of the tube 501 (which remains external to the body 410) is fixed into position. This may be achieved by any means, one example of such being fixed in position using a clamp.

Figure 6:
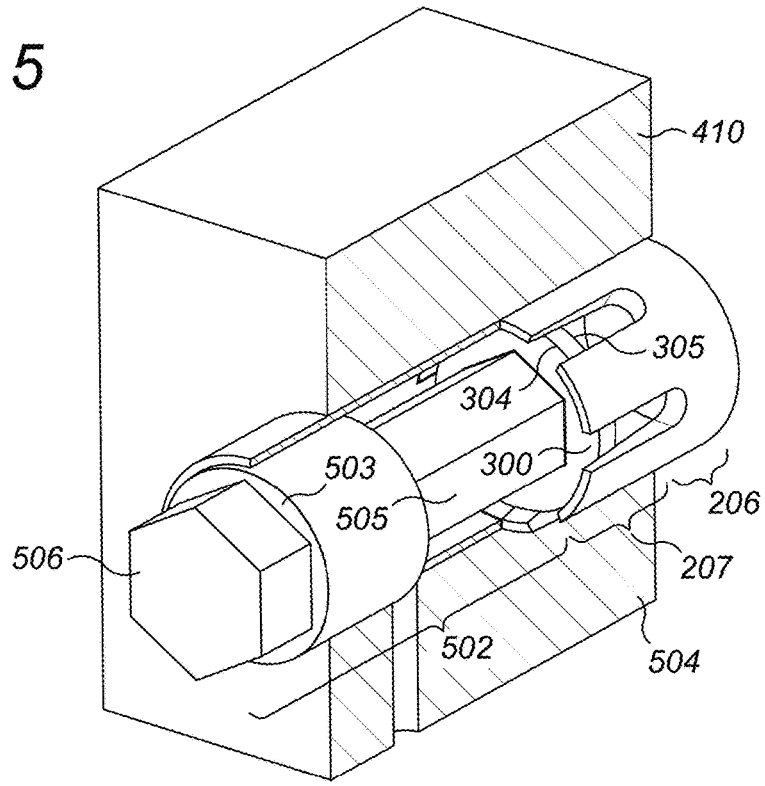
FIG. 6 shows a perspective view of FIG. 5 with part of the external cover being removed to reveal the internal features of the means for positioning the nozzle.

The nozzle 200 may then be locked into place via the use of a second rod 502 which comprises a first end 503 and a second end 504 with a longitudinal body 505 extending there between. In use, the second end 506 of the rod 502 is connected to the locking member 300 and both may then be inserted into the hollow of the anti-rotation tube 501 so that the first end of the rod 502 is positioned externally to the housing 410 and protruding out from the first end 580 of the anti-rotation tube 501 as shown in FIG. 5. As can be seen in FIGS. 5 and 6, the longitudinal body 505 of the rod 502 is positioned internally within the tube 501, and allows the user (via rotation of the protruding first end 503 of the rod 502) to provide torque to the locking member 300, to screw the locking member within the nozzle 200. FIG. 6 depicts the same features as FIG. 5, but with the nozzle anti-rotation tube 501 removed, so as to allow the internal features of the means 500 for calibrating (i.e. positioning and locking in place) the nozzle 200 to be seen.

In order to enable the user to screw the locking member 300 into place and thereby fix the nozzle 200 in position within the body 410, the second end 504 of the rod 502 is sized and shaped so as to contact the inner surface 306 of the ring-shaped locking member 300. Torque is then applied to the rod 502 at its first end 503 by the user.

Applying torque in this way allows for the locking member 300 to be moved axially into and within said nozzle 200 via said threaded surfaces 202, 301 and to radially expand said outer cylindrical surface 205 of the nozzle 200 into a press-fit arrangement with the inner surface 402 of said cylindrical bore of said body 410.

In some examples, the first end 503 of the rod 502 may comprise further means 506 for facilitating the rotation of the rod 502. In the example, the means 506 for facilitating the rotation of the internal rod 502 may comprise a bolt 506 having six (or indeed any number of) sides, which can be rotated with the use of a corresponding Allen key or with a spanner or other such griping means. In other examples, the rod 502 itself may simply be an Allen key, the outer surface of which may match the inner surface of the locking member 300.

Once the nozzle 200 has been correctly positioned within the body 410 and torque has been applied to the locking member 300 by screwing the locking member 300 into the nozzle in the direction of its second end 260, an improved press fit seal is formed between the external surface 205 of the nozzle 200 and the inner surface 402 of the housing 410, the greatest press fit being achieved in the section 206 of the nozzle 200 that does not comprise cut out sections 203. The rod 502 and anti-rotation means 501 may then be removed to leave the nozzle 200 in position within the cylindrical bore of the body 410.

Due to the unique design of the nozzles described herein with reference to FIGS. 3 to 8, calibration of the nozzle 200 within the servovalve is much easier than with known nozzles and methods. The requirements for the dimensions and tolerances of the servovalve body 410 and the nozzles 200 are also much lower than with known nozzles.

Known nozzles are usually centerless grinded and the hole in center of the body of the nozzle is burnished. With the new nozzles described herein, it is easy to manufacture these nozzles with cut-out sections via the use of milling, for example.

Due to the use of a rotatable locking member 300, the new nozzles 200, systems and methods described herein minimize axial forces as only torque is used to generate the press fit. This is a great improvement on other methods wherein axial forces are used to produce the press fit, as the use of axial forces can result in the nozzle being moved into an incorrect position.

In addition to this, the equipment required for inserting the locking member 300 into the nozzle 200 and producing this press fit is much simpler than in previous systems and methods.

In any of the examples described herein, the nozzle can easily be removed simply by unscrewing the locking member 300.

The resulting connection nozzle housing 410 in which the nozzle 200 is positioned will also be more resistant to thermal cycles as the locking member 300 may be made from the same material as the housing 410. The nozzle 200 may in some examples be made from a different material to the locking member 300 and/or the housing 410 and may be more deformable compared to known nozzles due to the presence of the cut-out sections 203.

The invention claimed is:

1. A system for locking a nozzle in place within a body of a servovalve, said body having a cylindrical bore defining an inner surface,
   said system comprising:
   said nozzle, the nozzle having a tubular shape extending between a first end and a second end with an outer cylindrical surface and an inner surface, said inner surface comprising a thread, and
   said system further comprising a locking member; said locking member being provided within said nozzle and comprising an outer circumferential surface having a thread that corresponds to the thread of the inner surface of the nozzle;
   and means for providing torque to said locking member to screw said locking member axially into and within said nozzle via said threaded surfaces and to radially expand said outer cylindrical surface of the nozzle into a press-fit arrangement with the inner surface of said cylindrical bore of said body of said servovalve;

wherein said first end of said nozzle is configured to receive said locking member; and wherein said nozzle comprises a first portion extending from said first end and in the direction of said second end, said first portion comprising a plurality of cut-out sections provided around its circumference with wall sections provided between said cut-out sections, said cut-out sections extending from said first end of the nozzle in the direction of the second end of the nozzle, said nozzle further comprising a second portion extending from said first portion in the direction of the nozzle second end, wherein said second portion comprises a solid tubular shape with a circumferentially extending wall to result in a press-fit seal between the external surface of the nozzle and the inner surface of cylindrical bore of said body of said servovalve.

2. The system of claim 1, wherein said nozzle has an inner diameter that decreases between said first end and said second end.

3. The system of claim 1, further comprising means for applying torque to said locking member by rotating said locking member along said threaded surfaces so as to move said locking member axially in the direction of said nozzle second end.

4. The system of claim 1, wherein said locking member is ring shaped with a first side and a second side and a circumferential outer surface extending between said first and second sides and wherein the outer diameter (D4, D3) of said ring shaped locking member decreases between said first side and said second side to provide a tapered outer surface that tapers at a first angle between said first side and said second side.

5. The system of claim 4, wherein said nozzle has an inner diameter that decreases between said first end and said second end to provide a tapered inner surface that tapers at a second angle between said first end and said second end and wherein said nozzle first end is configured to receive said locking member second end, and wherein said first angle and said second angle are equal.

6. The system of claim 1, further comprising means for preventing rotation of said nozzle within said body when said torque is applied to said locking member.

7. The system of claim 6, wherein said means for preventing rotation of said nozzle within said body comprises a tube extending from a first end to a second end, said second end of the anti-rotation tube comprising means for interlocking the second end of the tube with the first end of the nozzle, and comprising, at the tube first end, means for fixing said tube in position so as to prevent rotation of said tube.

8. The system of claim 7, wherein said means for interlocking comprises at least one cut-out section at said second end of said anti-rotation tube and at least one cut-out section at said first end of said nozzle, said cut-out sections being shaped and sized so as to enable the two ends to slot together and interlock.

9. A method for locking a nozzle in position within a body of a servovalve, said body having a cylindrical bore defining an inner surface, said method comprising:

positioning said nozzle within said cylindrical bore of said body of said servovalve, said nozzle having a tubular shape extending between a first end and a second end with an outer cylindrical surface and an inner surface said inner surface comprising a thread;

providing a locking member within said nozzle, said locking member comprising an outer circumferential surface having a thread that corresponds to the thread of the inner surface of the nozzle; and providing torque to said locking member to screw said locking member into and within said nozzle axially in a direction of the nozzle second end via said threaded surfaces and to radially expand said outer cylindrical surface of the nozzle into a press-fit arrangement with the inner surface of said cylindrical bore of said body of said servovalve;

wherein said first end of said nozzle is configured to receive said locking member; and wherein said nozzle comprises a first portion extending from said first end and in the direction of said second end, said first portion comprising a plurality of cut-out sections provided around its circumference with wall sections provided between said cut-out sections, said cut-out sections extending from said first end of the nozzle in the direction of the second end of the nozzle, said nozzle further comprises a second portion extending from said first portion in the direction of the nozzle second end, wherein said second portion comprises a solid tubular shape with a circumferentially extending wall to result in a press-fit seal between the external surface of the nozzle and the inner surface of cylindrical bore of said body of said servovalve.

10. The method of claim 9, wherein the outer surface of the locking member is ring shaped with a first side and a second side;

the method further comprising:

tapering, at a first angle, the outer surface of the ring shaped locking member so that the outer diameter of the locking member decreases between said first side and said second side at said first angle;

tapering the inner surface of the nozzle so that the inner diameter of the nozzle decreases between said first end and said second end to provide a tapered inner surface that tapers at a second angle between said first end and said second end, said first angle and said second angle being equal.

11. The method of claim 9, further comprising:

positioning said nozzle within said cylindrical bore of said body by providing a nozzle anti-rotation member having a first end and a second end; and prior to the step of positioning the nozzle in place within the cylindrical bore of said body, connecting the second end of the nozzle anti-rotation member to the first end of the nozzle and inserting the nozzle into the cylindrical bore of said body by moving the anti-rotation member and nozzle axially within said cylindrical bore of said body.

12. The method of claim 11 further comprising:

fixing in position the first end of the anti-rotation member to thereby preventing rotation of said nozzle within said body while providing torque to said locking member.

13. The method of claim 11, wherein said anti-rotation member comprises a tube extending from a first end to a second end, said second end of the anti-rotation tube comprising means for interlocking the second end of the tube with the first end of the nozzle.

14. The method of claim 13, wherein said means for interlocking comprises at least one cut-out section at said second end of said anti-rotation tube and at least one cut-out section at said first end of said nozzle, said cut-out sections being shaped and sized so as to enable the two ends to slot together and interlock.

\* \* \* \* \*